(12) United States Patent
Watanabe

(10) Patent No.: US 7,780,115 B2
(45) Date of Patent: Aug. 24, 2010

(54) AIRCRAFT, VEHICLE AND METHOD FOR ARRANGING SEATS THEREIN

(75) Inventor: Toshiyasu Watanabe, Nagoya (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 726 days.

(21) Appl. No.: 10/584,923

(22) PCT Filed: Oct. 1, 2004

(86) PCT No.: PCT/JP2004/014482
§ 371 (c)(1),
(2), (4) Date: Jun. 21, 2007

(87) PCT Pub. No.: WO2005/075289
PCT Pub. Date: Aug. 18, 2005

(65) Prior Publication Data
US 2008/0042010 A1    Feb. 21, 2008

(30) Foreign Application Priority Data
Feb. 5, 2004    (JP) ............................. 2004-029717

(51) Int. Cl.
*B64D 11/06* (2006.01)
(52) U.S. Cl. .................................. 244/118.6
(58) Field of Classification Search ............. 244/118.6, 244/118.5, 122 R
See application file for complete search history.

(56) References Cited

U.S. PATENT DOCUMENTS 4,936,620 A * 6/1990 Francois et al. ............... 296/64
6,012,679 A    1/2000 Auestad

FOREIGN PATENT DOCUMENTS

| GB | 590030 | 7/1947 |
|---|---|---|
| JP | 60-42132 | 3/1985 |
| JP | 2001-253283 | 9/2001 |

* cited by examiner

*Primary Examiner*—Timothy D Collins
(74) *Attorney, Agent, or Firm*—Wenderoth, Lind & Ponack, L.L.P.

(57) ABSTRACT

An aircraft (or vehicle) and a vehicle seat arranging method by which the number of seats is increased to the maximum, while comfortability of passengers is ensured, includes a seat 20B immediately adjacent to an inner wall surface 11a out of a plurality of seats 20 provided in an array in a body 11 of an aircraft (or vehicle) 10, with the seat 20B being arranged inwardly obliquely so that a foot clearance of passengers is ensured. Oblique angles of mutually adjacent seats 20A, 20B can be made different from each other to form a fan shape so that passengers are prevented from interfering with each other on their shoulders. Also, baggage receiving spaces 30 provided in immediate front of the seats 20A, 20B, respectively, can be arranged so as not to interfere with each other.

3 Claims, 8 Drawing Sheets

| $\theta_1$ | $\theta_2$ | $A_1$ | $A_2$ | Existence of Interference ||| $R_H$ | $R_F$ | $H_A$ |
|---|---|---|---|---|---|---|---|---|---|
| | | | | $C_F$ | $C_B$ | $P_B$ | | | |
| 0° | 1° | *** | *** | No | No | No | *** | *** | *** |
| 0° | 2° | ... | ... | ... | ... | ... | ... | ... | ... |
| ... | ... | ... | ... | ... | ... | ... | ... | ... | ... |
| 0° | 10° | ... | ... | ... | ... | ... | ... | ... | ... |
| 1° | 1° | ... | ... | Yes | No | No | ... | ... | ... |
| 1° | 10° | ... | ... | ... | ... | ... | ... | ... | ... |

(a)

(b)

(a)

(b)

AIRCRAFT, VEHICLE AND METHOD FOR ARRANGING SEATS THEREIN

TECHNICAL FIELD

The present invention relates to an aircraft or vehicle in which a plurality of passenger seats are arranged in array as well as relates to a method for arranging passenger seats therein.

BACKGROUND OF THE INVENTION

In an aircraft or in a vehicle, such as a train, bus or the like, there is a demand to arrange as many seats for passengers as possible. Hence, usually, the passenger seats are provided with the maximum number being arrayed relative to a widthwise size of an aircraft body (fuselage) or vehicle body.

In case of an aircraft, for example, if an outer diameter of the body is 115 inches (292.1 cm) or so, four seats arrayed in the width direction of the body can be arranged in rows in the length-wise direction of the body. But, in this case, if the outer diameter is less than 106 inches (269.2 cm), for example, no sufficient width of each seat or of a passage (aisle) can be ensured and arrangement of the four seats becomes physically difficult. Thus, conventionally, as shown in FIG. 7, in an example of an aircraft having a body 1 of an outer diameter less than 106 inches (269.2 cm) (the 328 type jet plane of Fairchild Dolnier Company, for example), three seats 2 are arranged in array in the width direction, that is, two rows of seats on one side and one row of seats on the other side with a passage therebetween are arranged.

In designing bodies of various vehicles including aircrafts, trains, buses, etc., it is sought that as many seats as possible are to be arranged in the limited space, as mentioned above. On the other hand, comfortability of passengers sitting on the seats must be ensured. If too many seats are arranged, the space for each of the seats becomes narrow so that the comfortability will be damaged.

For example, as shown in FIG. 8(a), an example in which seats 2 of four rows can be physically arranged relative to a body 1 is considered. In such case, even if the seats 2 can be physically arranged in four rows, if a width of each of the seats 2 or width of an arm rest (that is, an interval between adjacent two seats 2) is small, adjacent passengers will make contact with each other on their shoulders. If the width of the seat 2 or arm rest is thus made larger, a width of a passage 5 becomes narrow and movement of passengers or crew in the vehicle will become difficult.

In order to make both of the width of the seat 2 or arm rest and the width of the passage 5 as larger as possible, it is preferable to move the level of a floor 3 to around a vertical directional central position of an approximate circular cross sectional shape of the body 1. But if the level of the floor 3 is lifted too much, the space between the floor 3 and a ceiling of the body 1 will become too narrow and there is a limitation to do so.

Hence, if a sufficient width of the passage 5 and seat 2 is to be ensured with the comfortability of passengers being importantly considered, it will be the only way to make an outer diameter of the body 1 larger, as shown in FIG. 8(b).

But if the outer diameter (or cross sectional area) of the body 1 is made larger, it directly leads to an increase of aerodynamic drag of the aircraft. If the aerodynamic drag increases, in order to fly at the same velocity, a larger engine thrust will be needed and this will become a large obstruction for energy saving.

Hence, especially in the aircraft, in order to increase the number of seats as many as possible while the body is made as small as possible and the passenger comfortability is ensured as much as possible, there are many restrictions that make the realization thereof difficult.

SUMMARY OF THE INVENTION

In order to solve the technological problems in the prior art, it is an object of the present invention to provide an aircraft or vehicle that is able to increase the number of seats to the maximum while the passenger comfortability is ensured.

It is also an object of the present invention to provide a method for arranging seats in an aircraft or vehicle.

In the course of carrying out various studies for achieving the above objects, the inventors here have noticed a specific point in the case where a cross sectional shape of a body is such an approximate circular shape as in the case of an aircraft or is such a shape that a body width becomes smaller toward a lower portion of the body as in the case of a train and put eyes on this point.

That is, in case where the width of aircraft or vehicle body becomes smaller toward the lower portion, while a sufficient width for sitting can be comparatively easily secured at the level of a seat surface portion, with respect to the seat positioned immediately adjacent to an inner wall surface of the aircraft or vehicle body, the inner wall surface protrudes inward from the side at the level of a floor below the seat surface portion so that a foot portion of the seat becomes narrow. Thus, the passenger can hardly sit with his legs snugly stretched and feels that the comfortability is largely damaged. For the same reason, to put a hand baggage on the seat foot portion also becomes difficult.

Thus, provided by the present invention is an aircraft comprising a body having an approximate circular cross section, an inner wall surface of the body, a floor provided within the body and a plurality of seats provided in array on the floor, characterized in that at least a first seat immediately adjacent to the inner wall surface out of the plurality of seats is arranged obliquely toward a central side of the body relative to a proceeding direction of the body.

In this way, by arranging the first seat immediately adjacent to the inner wall surface of the body obliquely toward the fronter central side of the body relative to the proceeding direction of the body or inwardly obliquely relative to the straight proceeding direction of the body, a foot portion of a passenger sitting on the first seat, that is, a foot portion below in immediate front of the first seat, becomes remote from the inner wall surface of the body and thereby the space of the foot portion becomes broader.

It is to be noted that while the cross section of the body is mentioned as an approximate circular cross section, this may also include a cross section constructed by a quadratic curve, such as an elliptical shape or the like, or a cross section constructed by a double bubble shape in which two or more arcuate shapes are combined around the position of the floor (such as of the 737 type aircraft of Boeing Company, for example) or the like.

In the above aircraft, not only the first seat but also a second seat on a side of the first seat may be arranged obliquely toward the central side of the body relative to the proceeding direction of the body.

Here, the second seat is not necessarily such a seat as arranged immediately adjacent to the first seat but may be such a seat or seats as arranged in the same array as the first seat. That is, in case where three or more seats are arrayed on one side of the passage, relative to the first seat arranged immediately adjacent to the inner wall surface of the body, all other seats arrayed on the passage side can be called the second seat.

Oblique angles of the first and second seats relative to the proceeding direction of the body may be different from each other. If the oblique angle of the first seat is set larger than the oblique angle of the second seat, an interval between the first seat and the second seat becomes broader toward seat rear portions from seat front portions. Thereby, a broader width between seat back portions, that is, portions where shoulders of passengers are positioned, can be ensured.

Also, provided by the present invention is an aircraft comprising a body having an approximate circular cross section, an inner wall surface of the body, a floor provided within the body and a plurality of seats provided in array on the floor, characterized in that at least a seat immediately adjacent to the inner wall surface out of the plurality of seats is arranged obliquely relative to a proceeding direction of the body so that when a passenger sits on the seat, predetermined clearances relative to the inner wall surface are formed around a head portion and foot portion of the passenger.

Each of the plurality of seats has a baggage receiving portion provided below a seat in immediate front thereof and the baggage receiving portion of the seat immediately adjacent to the inner wall surface and the baggage receiving portion of a seat on a side of the seat immediately adjacent to the inner wall surface are preferably arranged so as not to interfere with each other.

The present invention is applicable not only as an aircraft but also as a vehicle, such as a train, automobile or the like, movable with a plurality of passengers received therein. This vehicle comprises a body forming an outer shell of the vehicle, an inner wall surface of the body and a plurality of seats provided in array within the body and is characterized in that at least a first seat immediately adjacent to the inner wall surface out of the plurality of seats is arranged inwardly obliquely relative to the body.

Here, the present invention is especially suitable to be applied to such a case that a width size of the vehicle body becomes smaller toward a lower portion of the body.

The first seat and a second seat on a side of the first seat are preferably arranged so that passengers sitting on the first and second seats do not interfere with each other on their shoulders. For this purpose, the first and second seats may be arranged such that an interval between the first seat and the second seat becomes broader toward seat rear portions from seat front portions so as to form an approximate fan shape or the first and second seats may be arranged being moved forward or backward relative to each other.

Also, provided by the present invention is a vehicle, movable with a plurality of passengers received therein, comprising a body forming an outer shell of the vehicle and a plurality of seats provided in array within the body, characterized in that mutually adjacent seats out of the plurality of seats are arranged so that an interval between rear end portions of the mutually adjacent seats is larger than an interval between front end portions of the mutually adjacent seats.

Moreover, the present invention provides a vehicle seat arranging method. This method is for arranging a plurality of seats in array within a body forming an outer shell of a vehicle and is characterized in comprising the steps of: deciding an arrangement angle relative to the body of at least a first seat immediately adjacent to an inner wall surface of the body out of the plurality of seats so that when a passenger sits on the first seat, predetermined clearances relative to the inner wall surface of the body are formed around a head portion and foot portion of the passenger and deciding, based on the arrangement angle of the first seat, an arrangement angle of a second seat on a side of the first seat.

In the above method, the arrangement angles of the first and second seats are preferably decided so that a baggage receiving portion of a predetermined size positioned below a seat in immediate front of the first seat and a baggage receiving portion of a predetermined size positioned below a seat in immediate front of the second seat do not interfere with each other.

Also, the arrangement angles of the first and second seats are preferably decided so that passengers sitting on the first and second seats do not interfere with each other on their shoulders.

The above-mentioned methods may be automatically performed by a computer device that is previously installed with a predetermined computer program.

According to the present invention, the number of seats can be ensured to the maximum while the passenger comfortability is maintained. Also, as the outer diameter of the body can be suppressed to the minimum, aerodynamic drag of the body can be suppressed and an aircraft excellent in the economy can be realized. Also, while the floor width is limited to be provided in the body having an approximate circular cross sectional shape, the height of the passage can be ensured to the maximum and an effective use of the body cross sectional area can be realized.

BRIEF DESCRIPTION OF THE DRAWINGS

FIGS. 4(a) and (b) are views showing items to be considered for deciding seat arrangement angles, wherein FIG. 4(a) is an aircraft (or vehicle) body cross sectional view taken through a passenger foot position for showing a relation between a passenger foot space and a body inner wall surface and FIG. 4(b) is an aircraft (or vehicle) body cross sectional view taken through a passenger upper half body position for showing a relation between a passenger head space and the body inner wall surface.

FIG. 5 is a table showing examples of procedures for evaluating respective items in the case where sets of seat arrangement angles are variously changed in order to decide the seat arrangement angles.

FIGS. 6(a) and (b) are views for explaining seat arrangements in an aircraft (or vehicle) as further embodiments according to the present invention, wherein FIG. 6(a) is of an embodiment where a seat on the body inner wall surface side is moved backward and FIG. 6(b) is of an embodiment where the seat on the body inner wall surface side is moved forward.

FIGS. 8(a) and (b) are prior art aircraft (or vehicle) body cross sectional views, wherein FIG. 8(a) is of an example where four rows of seats are arranged but a predetermined space is not sufficiently ensured and FIG. 8(b) is of an example where an outer diameter of the body is enlarged so as to ensure the predetermined space.

DETAILED DESCRIPTION OF THE INVENTION

The present invention will be concretely described based on embodiments shown in the appended figures.

Figure 1:
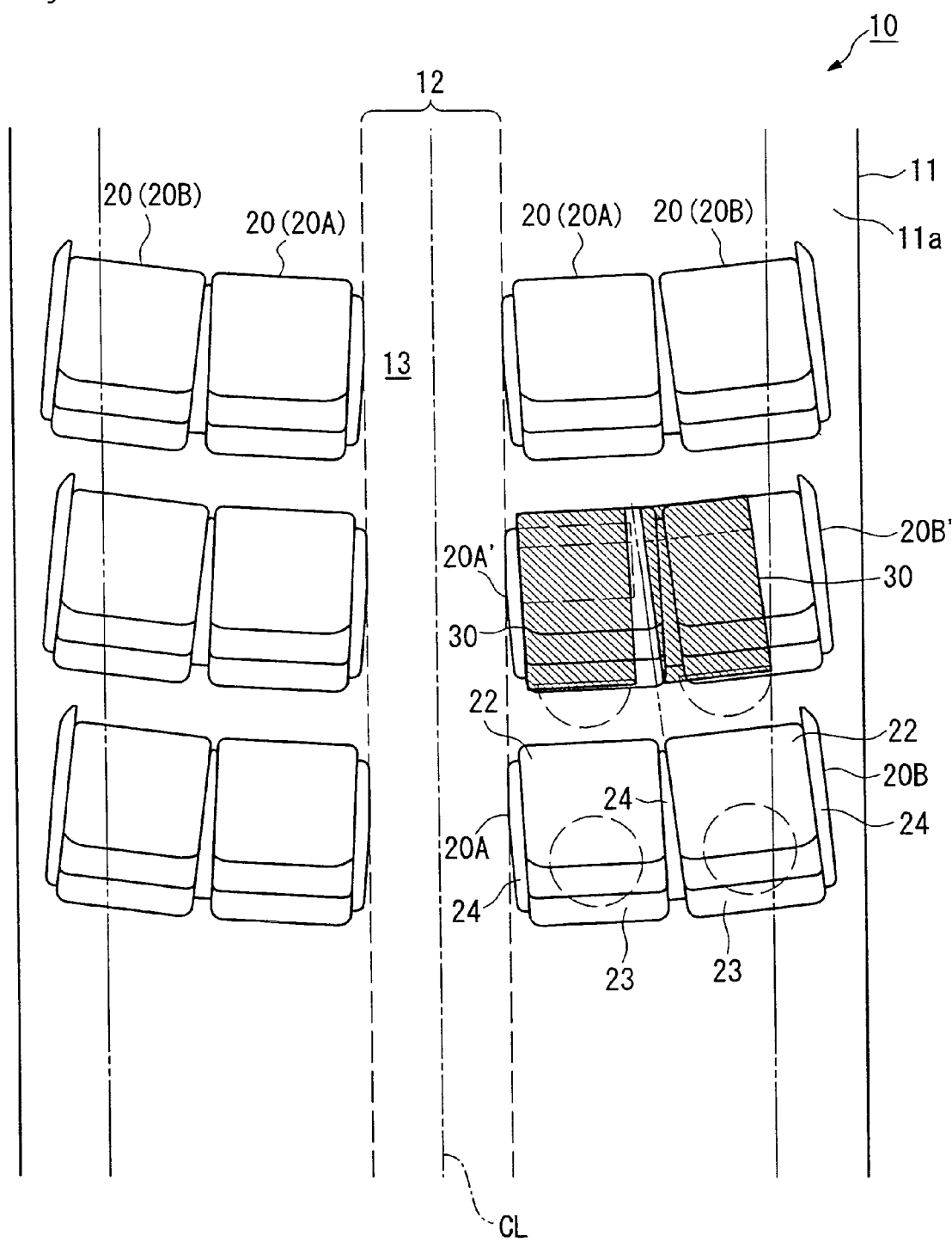
FIG. 1 is a plan view for explaining a seat arrangement in an aircraft (or vehicle) as an embodiment according to the present invention.
Figure 2:
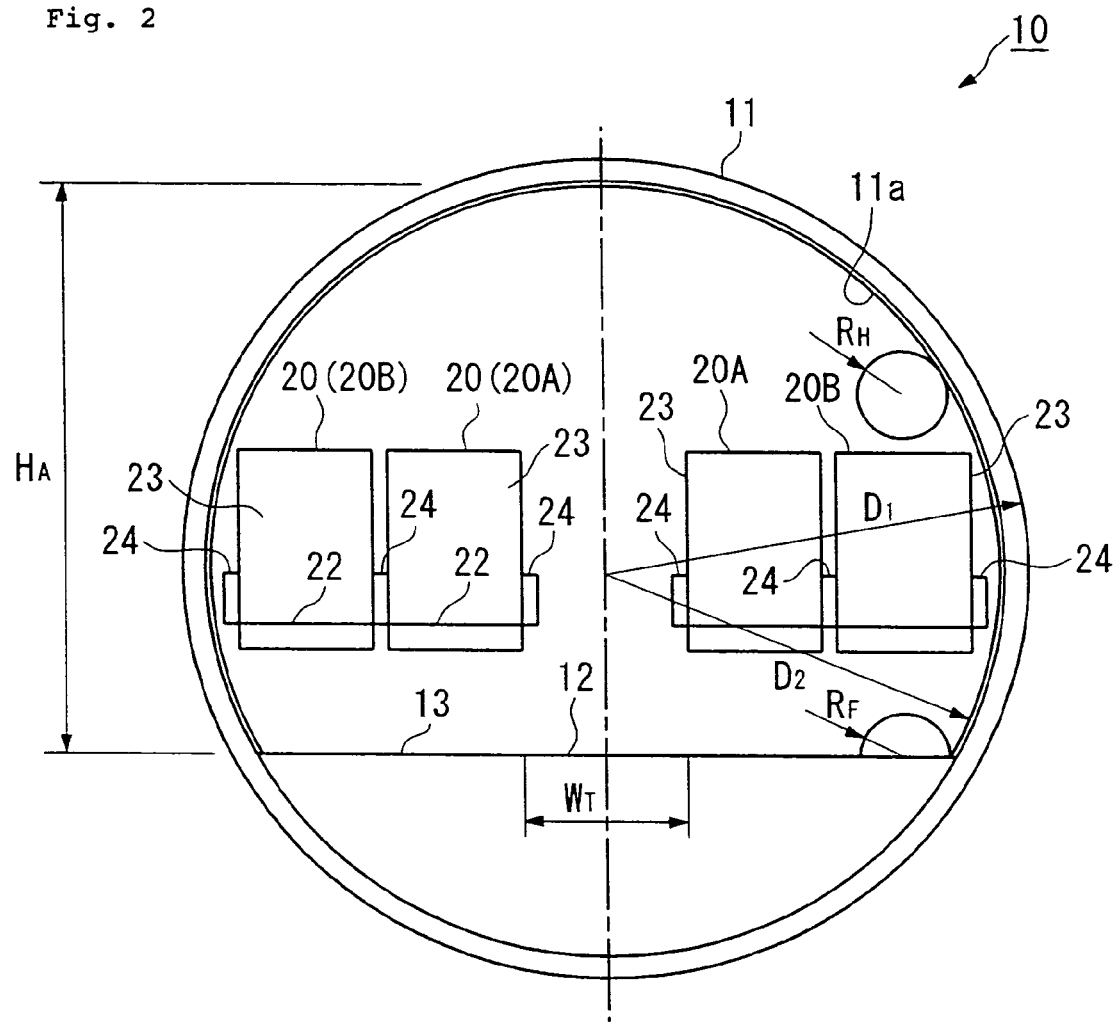
FIG. 2 is an aircraft (or vehicle) body cross sectional view for explaining the seat arrangement of FIG. 1.

FIG. 1 and FIG. 2 are explanatory views showing a seat arrangement in an aircraft (or vehicle) 10 as an embodiment according to the present invention.

As shown in FIG. 1 and FIG. 2, the aircraft (or vehicle) 10 comprises a body 11, in which a plurality of seats 20 are arranged such that a passage 12 is provided at a length-wise directional central portion and two rows of seats on each side of the passage 12, that is, four rows in all, are arranged.

The seats 20 are fitted to a floor 13 provided at a predetermined level of the body 11 via base attachments (not shown). Each of the seats 20 comprises a seat surface portion 22 and a seat back 23 reclinably fitted to the seat surface portion 22 via a link provided at a rear end of the seat surface portion 22. Also, between adjacent two seats 20A (a second seat) and 20B (a first seat), on the passage 12 side of the seat 20A and on the inner wall surface 11a of the body 11 side of the seat 20B, respectively, arm rests 24 are provided.

For passengers sitting on the seats 20A, 20B, spaces between the seat surface portions 22 of seats 20A', 20B' in immediate front of the seats 20A, 20B, respectively, and the floor 13 are prepared as baggage receiving spaces 30 for receiving hand baggages of the passengers.

Figure 3:
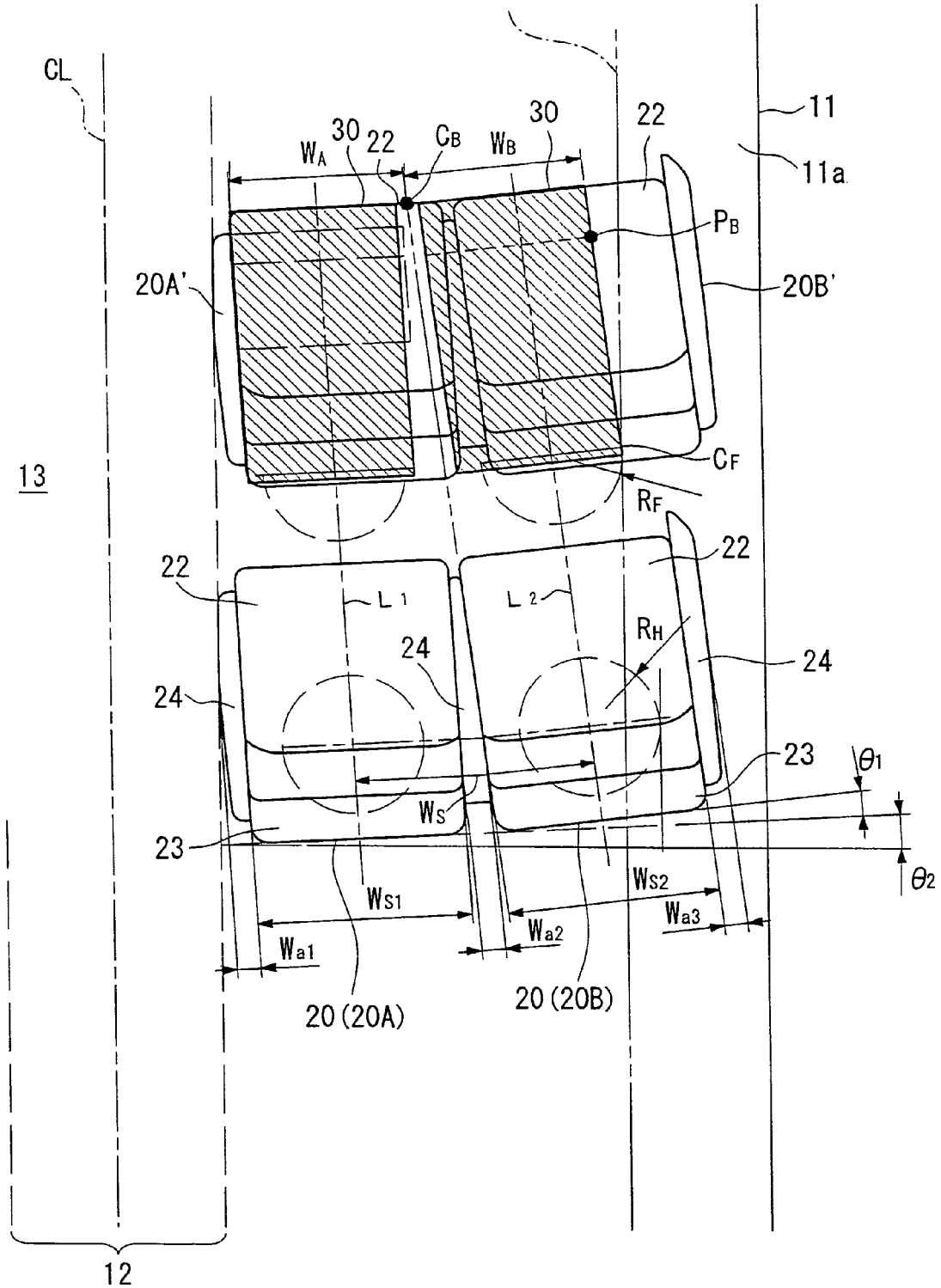
FIG. 3 is a plan view for explaining seat arranging procedures of the seat arrangement of FIG. 1.

As shown in FIG. 3 being a plan view showing the seat arrangement, each of the seats 20A, 20B is arranged being inwardly directed with a predetermined oblique angle relative to a center line CL of the passage 12 (or a center line CL of the body 11), that is, each of the seats 20A, 20B is arranged so as to be directed to a fronter point on the center line CL.

Moreover, on the respective sides of the passage 12, the oblique angles of the mutually adjacent seats 20A, 20B relative to the center line CL are set so as to be different from each other. That is, relative to the center line CL, the oblique angle of the seat 20A on the nearby side of the passage 12 is set smaller than that of the seat 20B on the remote side of the passage 12. By this arrangement, the seat interval between the mutually adjacent seats 20A, 20B becomes gradually larger toward the seat rear side from the seat front side so as to form an approximate fan shape.

Figure 4:
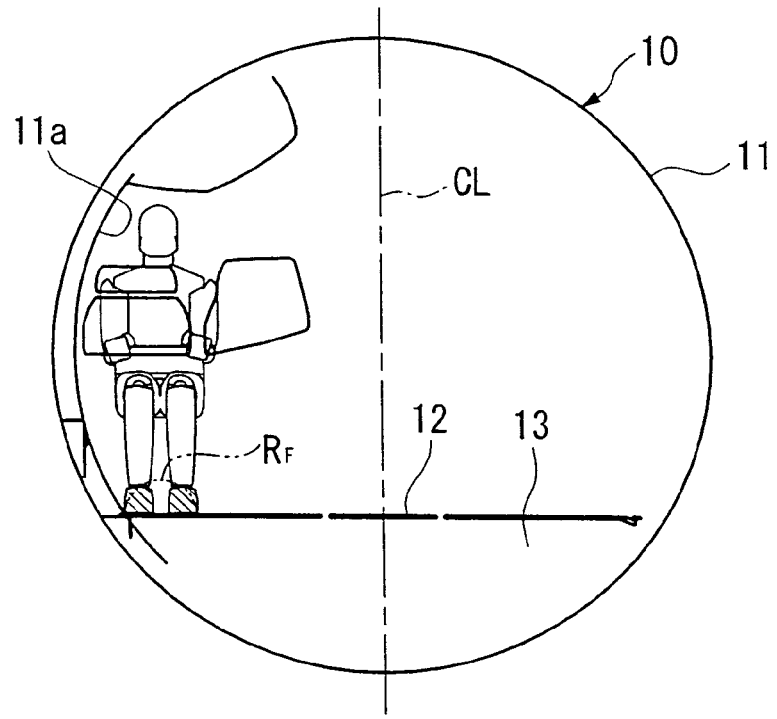
Figure 4:
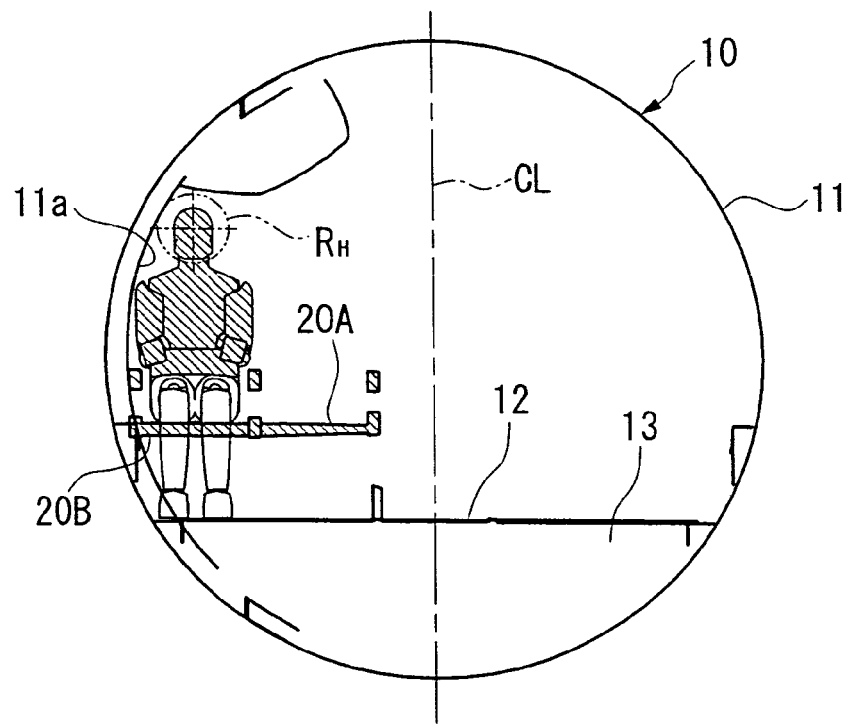

In this way, by the seat 20B immediately adjacent to the inner wall surface 11a of the body 11 arranged being inwardly directed, at the level of the floor 13 having a size relative to the inner wall surface 11a smaller as compared with the level of the seat surface portion 22 of the seat 20B, as shown in FIG. 4(a), a width relative to the inner wall surface 11a of a foot space in immediate front of the seat 20B, that is, a foot clearance $R_F$ of a passenger sitting on the seat 20B, becomes broader than in the case where the seat 20B is arranged in parallel to the center line CL.

Also, while the seat 20B is obliquely arranged, if the seat 20A is left arranged in parallel to the center line CL, the baggage receiving spaces 30 formed below immediate front seats 20A', 20B', respectively, will interfere with each other so that a width $W_B$ of the baggage receiving space 30 below the seat 20B' will become narrow. But this is avoided by the seats 20A, 20B (20A', 20B') being obliquely arranged relative to each other. Moreover, by such arrangement of the seats, when passengers sit on the seats 20A, 20B, a width $W_S$ of the portion where shoulders of the passengers are positioned or where upper end portions of the seat backs 23 are positioned can be made broader and thereby the mutually adjacent passengers can be prevented from making contact with each other on their shoulders.

Such arrangement of the seats 20A, 20B can be decided by procedures as follows.

Here, $W_{S1}$ is a width of the seat surface portion 22 of the seat 20A, $W_{S2}$ a width of the seat surface portion 22 of the seat 20B, $W_{a1}$ a width of the arm rest 24 on the passage 12 side of the seat 20A, $W_{a2}$ a width of the arm rest 24 between the seats 20A and 20B and $W_{a3}$ a width of the arm rest 24 on the inner wall surface 11a side of the seat 20B.

First, an outer diameter $D_1$ and inner diameter $D_2$ of the body 11 and a height $H_A$ and width $W_T$ of the passage 12, as shown in FIG. 2, are decided in advance. Then, as shown in FIG. 4(b), in the state that a passenger sits on the seat 20B, the seat 20B is so positioned that a predetermined clearance (head clearance $R_H$) is formed around a head portion of the passenger (step S101).

Also, while the passenger sits on the seat 20B, as shown in FIG. 4(a), a minimum oblique angle $\theta_0$ of the seat 20B is so decided that a predetermined foot clearance $R_F$ can be ensured at the portion where the feet of the passenger are positioned.

Then, as shown in FIG. 3, an oblique angle $\theta_1$ of the seat 20B relative to the seat 20A and an oblique angle $\theta_2$ of the seat 20A relative to the center line CL are so set that the minimum oblique angle $\theta_0$ is satisfied. In this case, with respect to the mutually adjacent seats 20A, 20B, if the arm rest width $W_{a2}$ is small so that the width $W_S$ of the portion where shoulders of passengers are positioned is not realized to be a necessary minimum predetermined value $W_0$ or more ($W_{S \geq W_0}$), the seat 20B is rotated around an arbitrary point (point $C_1$, for example) between center lines $L_1$, $L_2$ of the seats 20A, 20B, respectively, and thereby such oblique angle $\theta_1$ as satisfies that $W_S$ is $W_0$ or more ($W_S \geq W_0$) is employed (step S102).

At the position of the seat 20B decided by the step S101, on the condition that a width $W_A$ of the baggage receiving space 30 prepared for the seat 20A equals a width $W_B$ of the baggage receiving space 30 prepared for the seat 20B ($W_A=W_B$), the oblique angle $\theta_2$ of the seat 20A relative to the center line CL is so set that front end portions of the two baggage receiving spaces 30 do not interfere with each other at a point $C_B$ between the front end portions of the two baggage receiving spaces 30 and also a rear end portion of the baggage receiving space 30 prepared for the seat 20B does not interfere with the inner wall surface 11a at a point $C_F$ on the position where the floor 13 connects to the inner wall surface 11a. Moreover, if a recess is to be provided in the floor 13 for enlarging an effective space of the baggage receiving space 30, it is so provided that a point $P_B$ on the outermost position of a lower end portion of the recess does not interfere with the inner wall surface 11a (step S103).

By carrying out the above-mentioned steps S101 to S103, sets of such oblique angles $\theta_1$, $\theta_2$ as satisfy all of the conditions are selected to be employed.

FIG. 5 is a table showing examples of procedures for evaluating respective evaluation items of the steps S101 to S103 in the case where sets of oblique angles $\theta_1$, $\theta_2$ are variously changed. As shown by these examples, such sets of oblique angles $\theta_1$, $\theta_2$ as appropriately satisfy the predetermined conditions are selected to be employed.

The above-mentioned steps S101 to S103 can also be performed by a computer device that is previously inputted with a predetermined computer program so as to automatically carry out the evaluation procedures and put out candidates of optimum conditions (the oblique angles $\theta_1$, $\theta_2$). For this purpose, the computer device can be previously inputted to be appropriately set with the data of the widths $W_{S1}$, $W_{S2}$ of the seat surface portions 22, widths $W_{a1}$, $W_{a2}$, $W_{a3}$ of the arm rests 24, outer diameter $D_1$ and inner diameter $D_2$ of the body 11, height H and width $W_T$ of the passage 12, head clearance $R_H$, foot clearance $R_F$, etc.

In this way, even if the radial directional size of the body 11 is small, the seats 20 can be arranged in four rows. Especially, by arranging the seat 20B immediately adjacent to the inner wall surface 11a of the body 11 inwardly obliquely, a broader space around the foot portion of the passenger can be ensured. Also, by arranging the mutually adjacent seats 20A, 20B in an approximate fan shape with oblique angles different from each other, the width $W_S$ at the position of shoulders of passengers sitting on the seats 20A, 20B can be elongated so that the passengers can be prevented from making contact with each other on their shoulders.

Moreover, with respect to the baggage receiving spaces 30 below in immediate front of the seats 20A, 20B, respectively, substantially the same broadness relative to each other can be ensured.

Also, by arranging not only the seat 20B but also the seat 20A on the passage 12 side likewise inwardly obliquely, the passenger sitting on the seat 20B can be prevented from minding if the foot clearance $R_F$ or baggage receiving space 30 that he is using invades the foot clearance $R_F$ or baggage receiving space 30 that the passenger sitting on the seat 20A is using.

As the result, the number of the seats 20 is ensured to the maximum and yet the comfortability of passengers also can be ensured. Moreover, the outer diameter of the body 11 can be suppressed to the minimum to thereby suppress the aerodynamic drag of the body 11. Thus, the aircraft (or vehicle) 10 excellent in the economy can be realized.

Also, while a width of the floor 13 is limited to be provided in the body 11 having an approximate circular cross sectional shape, the height $H_A$ of the passage 12 can be ensured to the maximum. Hence, an effective use of the cross sectional area of the body 11 can be realized.

It is to be noted that in the above embodiment, the oblique angle $\theta_1$ or $\theta_2$ can also be set to zero according to the size of the inner diameter $D_2$ of the body 11, width $W_{a2}$ of the arm rest 24 between the seats 20A and 20B or the like.

Figure 6:
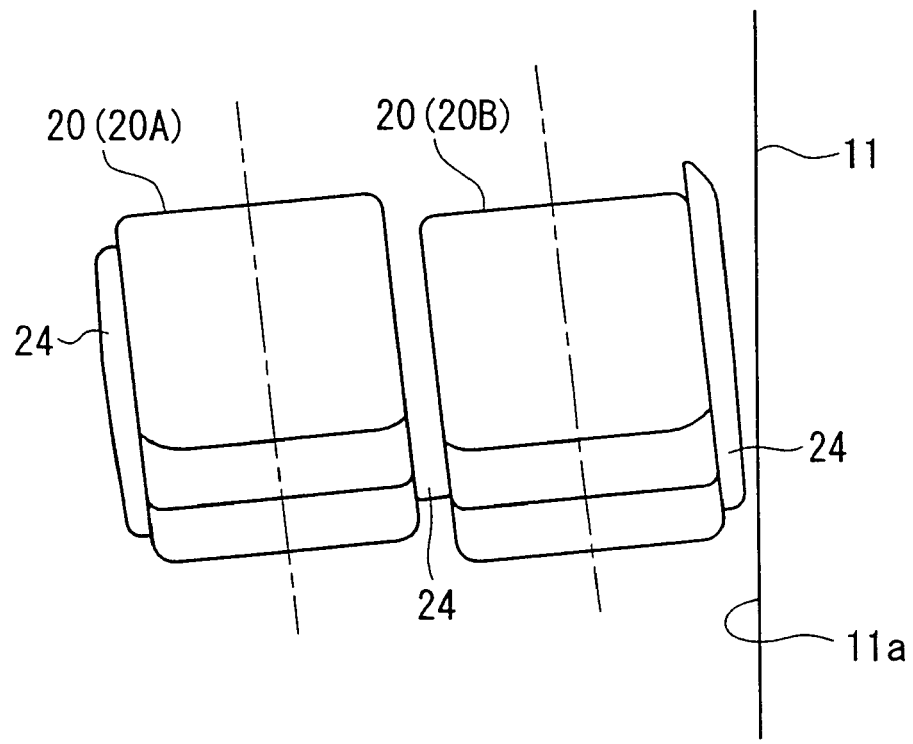
Figure 6:
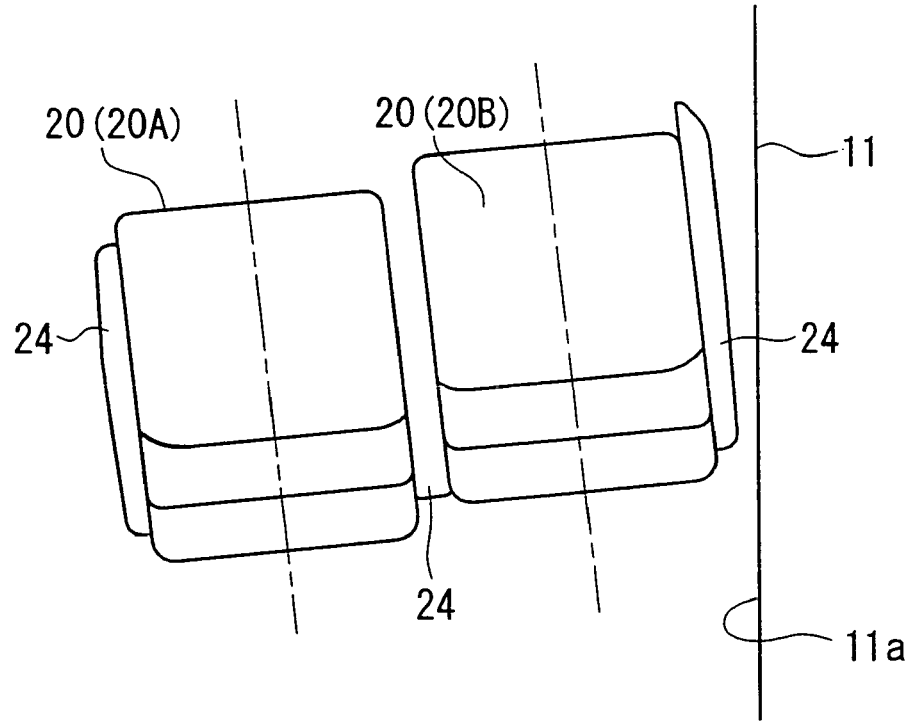
Figure 7:
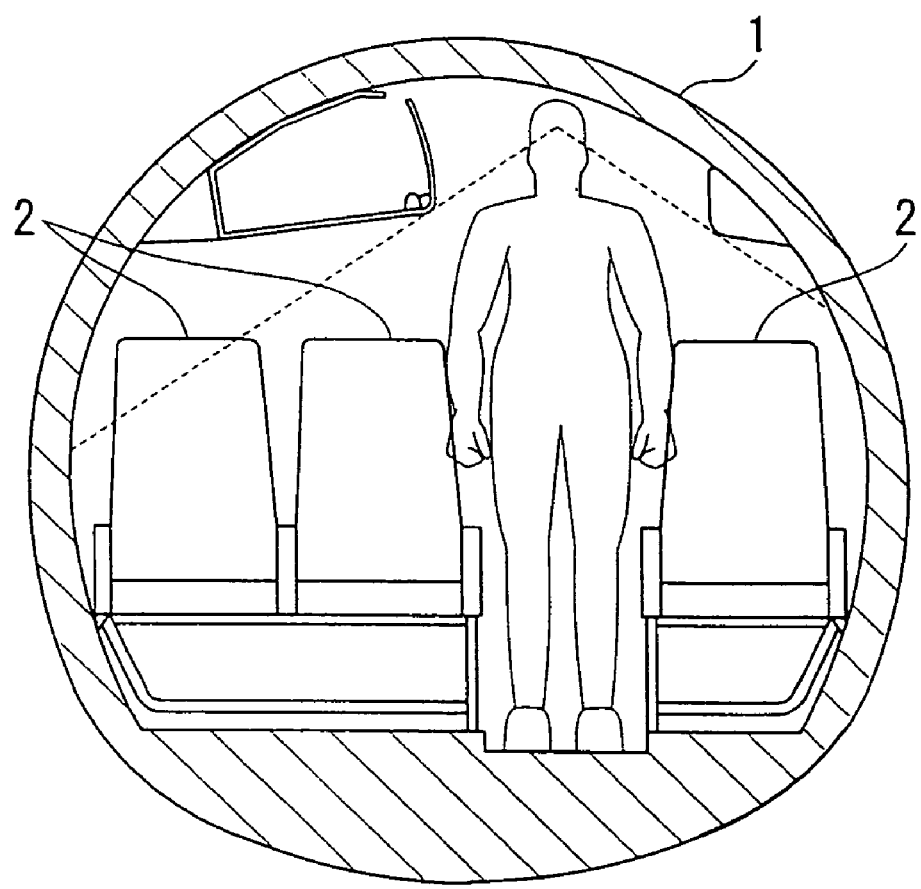
FIG. 7 is a prior art aircraft (or vehicle) body cross sectional view showing an example where three rows of seats are arranged.
Figure 8:
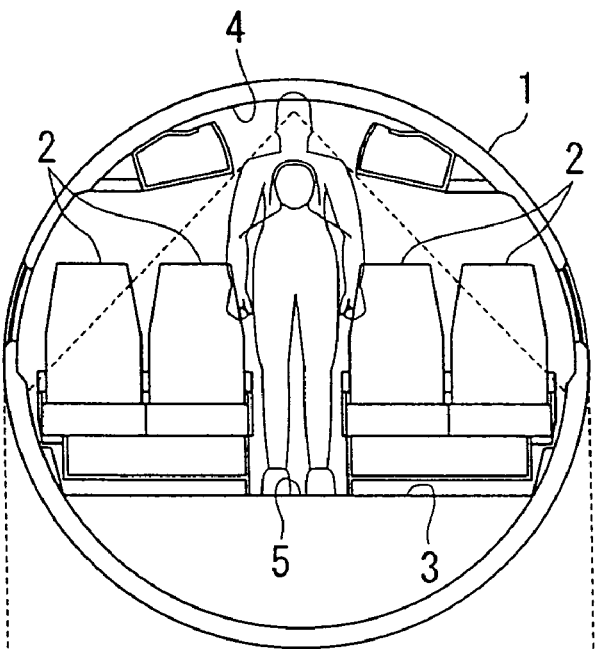
Figure 8:
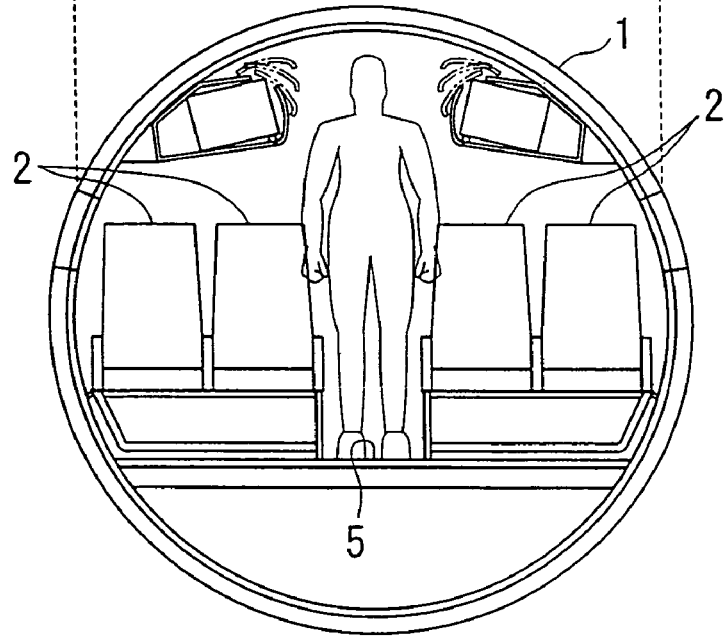

Also, in the above embodiment, while the construction is made such that the seats 20A, 20B are arranged in the approximate fan shape with the oblique angles different from each other in order to prevent interferences between shoulders of mutually adjacent passengers, other constructions can also be employed for achieving the same object. For example, as shown in FIGS. 6(a) and (b), the mutually adjacent seats 20A, 20B are arranged being moved forward or backward relative to each other. In this case, the oblique angles $\theta_1$ and $\theta_2$ may be different from each other or the same to each other.

In this way, by moving the mutually adjacent seats 20A, 20B forward or backward relative to each other, positions of shoulders of the mutually adjacent passengers are also moved forward or backward relative to each other. Thus, the width $W_{a2}$ of the arm rest 24 between the seats 20A and 20B can be made narrower or the widths $W_{S1}$, $W_{S2}$ of the seat surface portions 22 of the seats 20A, 20B can be made smaller. As the result, the total width of the seats 20A, 20B can be made smaller and such an advantage, for example, that the width $W_T$ of the passage 12 is made larger can be obtained.

While the above embodiments have been described with respect to the case where the seats 20 are arranged with two rows on each side of the passage 12, that is, with four rows in all within the body 11, the present invention is not limited thereto but may be applied to other cases, such as a case where the seats 20 are arranged with one row only or three or more rows on one side of the passage 12. Moreover, even if two or more passages 12 are to be provided, the present invention is also applicable.

In other cases also, the present invention is applicable with modifications in the construction appropriately selected within the scope of claims of the invention as appended herein.

What is claimed is:

1. An aircraft comprising:
   a body having an approximate circular cross section, said body having an inner wall surface;
   a floor provided within said body; and
   a plurality of seats provided in an array on said floor, wherein said plurality of seats includes a first seat immediately adjacent to said inner wall surface, said first seat being arranged obliquely toward a central portion of said body and obliquely relative to a proceeding direction of said body,
   wherein said plurality of seats includes a second seat adjacent to said first seat, said second seat being arranged obliquely toward the central portion of said body and obliquely relative to the proceeding direction of said body,
   and wherein an oblique angle of said first seat relative to the proceeding direction of said body is larger than an oblique angle of said second seat relative to the proceeding direction of said body.

2. An aircraft according to claim 1, wherein said first seat is arranged to support a passenger so as to form predetermined clearances relative to said inner wall surface around a head portion and foot portion of the passenger.

3. An aircraft according to claim 1, wherein each of said seats has a baggage receiving portion provided below a corresponding seat arranged immediately in front thereof, wherein the baggage receiving portion of said first seat and the baggage receiving portion of said second seat are arranged so as not to interfere with each other.

* * * * *